(12) United States Patent
Worthington et al.

(10) Patent No.: US 9,223,675 B2
(45) Date of Patent: Dec. 29, 2015

(54) CHARACTERIZING DEVICE PERFORMANCE BASED ON USER-PERCEIVABLE LATENCY

(75) Inventors: Bruce L. Worthington, Redmond, WA (US); Jason Carl Hendrickson, Seattle, WA (US); Robert P. Fitzgerald, Fall City, WA (US); Stuart Sechrest, Redmond, WA (US); Changjiu Xian, Sammamish, WA (US); Qi Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 419 days.

(21) Appl. No.: 13/299,189

(22) Filed: Nov. 17, 2011

(65) Prior Publication Data

US 2013/0132616 A1 May 23, 2013

(51) Int. Cl.
*G06F 3/00* (2006.01)
*G06F 11/34* (2006.01)
*G06F 5/00* (2006.01)

(52) U.S. Cl.
CPC ........ *G06F 11/3428* (2013.01); *G06F 11/3419* (2013.01); *G06F 11/3485* (2013.01); *G06F 2201/81* (2013.01)

(58) Field of Classification Search
USPC .......................................................... 710/18
See application file for complete search history.

(56) References Cited

U.S. PATENT DOCUMENTS

| 7,643,983 | B2 | 1/2010 | Lumb et al. |
| 8,402,471 | B2 * | 3/2013 | Fareed ..................... 718/105 |
| 2002/0065910 | A1 * | 5/2002 | Dutta ..................... 709/224 |
| 2011/0010343 | A1 | 1/2011 | Chavda et al. |

OTHER PUBLICATIONS

Gurun, et al., "NWSLite: A Light-Weight Prediction Utility for Mobile Devices", In Proceedings of the 2nd International Conference on Mobile Systems, Applications and Services, Jun. 9, 2004, 10 pages.
Huang, et al., "Performance Modeling and Analysis of Flash-based Storage Devices", In Proceedings of IEEE Symposium on Massive Storage Systems and Technologies, May 26, 2011, 11 pages.
Kraft, et al., "IO Performance Prediction in Consolidated Virtualized Environments", In Proceeding of the Second Joint WOSP/SIPEW International Conference on Performance Engineering, Mar. 15, 2011, pp. 295-306.

(Continued)

*Primary Examiner* — Henry Tsai
*Assistant Examiner* — Dean Phan
(74) *Attorney, Agent, or Firm* — Judy Yee; John Jardine; Micky Minhas

(57) ABSTRACT

A method and an apparatus for characterizing performance of a device based on user-perceivable latency. To characterize device performance, a value of a metric may be computed from latencies of operations performed by the device. In computing a value of a metric, latencies may be treated differently, such that some latencies perceivable by a user of the device may have a greater impact on the value of the metric than other latencies that either are not perceivable or are perceived by the user to a lesser degree. Such a performance metric based on user-perceivable latency facilitates identification of computing device that provide a desirable user experience.

19 Claims, 6 Drawing Sheets

(56) References Cited

OTHER PUBLICATIONS

Pinheiro, et al., "Failure Trends in a Large Disk Drive Population", In Proceedings of the 5th USENIX Conference on File and Storage Technologies, Feb. 16, 2007, 13 pages.

Wang, et al., "Storage Device Performance Prediction with CART Models", In Proceedings of IEEE International Symposium on Modeling, Analysis, and Simulation of Computer and Telecommunication Systems, Oct. 7, 2004, pp. 588-595.

* cited by examiner

CHARACTERIZING DEVICE PERFORMANCE BASED ON USER-PERCEIVABLE LATENCY

BACKGROUND

Many modern computers rely on various types of components to perform a wide variety of tasks, such as data processing, storage, and communication. Examples of such components include storage drives, network cards, and specialized operation accelerators (e.g., for encryption, media decoding, etc.). If the components of a computer fail to meet the performance requirements of a piece of software, executing that software on the computer may yield an unacceptable user experience. In such a case, the computer user may become frustrated and may mistakenly interpret the software's malfunction as a deficiency of the software, rather than as a deficiency of the computer's other components.

In order to avoid or reduce software malfunction and user frustration, software vendors may recommend that their software be executed on computers that are certified to contain components capable of providing specified performance levels. Computer vendors may communicate such certifications to consumers by displaying certification logos on advertisements and packaging for a computer. Accordingly, computer designers who seek to obtain such certifications for their computers may select components based on the performance levels they provide. Accordingly, component designers may design their components to provide the desired levels of performance according to accepted performance metrics. Performance metrics therefore play an important role in both the design and marketing of computers and their components.

Performance metrics may be used to standardize measurement and expression of performance levels of computing devices, such as individual components, sets of components, and entire computers. Different performance metrics may relate to different features of a device. For example, some performance metrics may relate to bandwidth, while others may relate to latency. Among the performance metrics that relate to latency, some may describe average latency, while others may describe worst-case latency. Also, the performance of a device may depend on the conditions under which the device's performance is measured. For example, a device that performs well when subjected to one workload may perform poorly when subjected to a different workload.

Measuring a device's performance may comprise observing or recording the device's response to a sequence of commands. The sequence of commands may be provided by a synthetic benchmark or a trace. A synthetic benchmark may contain a sequence of commands designed to expose an aspect of the device's performance under stressful conditions, or to emphasize an aspect of the device's performance under idealized conditions. A trace may contain a sequence of commands corresponding to a real-world workload of interest. For example, a trace may contain commands issued to a storage unit by a mobile computer executing a mobile computing workload.

SUMMARY

The inventors have recognized and appreciated that an improved method of characterizing the performance of a device may be provided by rating the device based on user-perceivable latency associated with using it. In some embodiments, the method may involve collecting latencies of operations associated with the device, selecting a subset of the collected latencies, and computing a device rating based on the selected subset of latencies.

In some embodiments, the subset of latencies may be selected based on their predicted impact on a user of the device. Thus, in some embodiments, operations having latencies that are not predicted to be user-perceivable may not contribute to the device rating, while operations having latencies that are predicted to be user-perceivable may contribute to the device rating. In this manner, the selected latencies may be representative of latencies that a user will perceive.

In some embodiments, the latency corresponding to an operation may be selected for inclusion in the subset based on whether a duration of the latency exceeds a threshold and/or based on an attribute of the corresponding operation. Attributes of the operation relevant to inclusion of the latency in the subset may include whether the operation is associated with a background application, a priority of the operation, a size associated with the operation, a location associated with the operation, and/or a type of the operation. Thus, in some embodiments, operations having latencies that exceed a threshold and/or having specific attributes may contribute to the device rating, while other operations may not contribute to the rating.

In some embodiments, the method may involve collecting latencies of operations associated with the device, and performing differentiated processing of the latencies to convert them into the rating. In some embodiments, the differentiated processing may be based on durations of the latencies and/or attributes of the operations corresponding to the latencies.

In some embodiments, computing the device rating may involve obtaining scores of latencies in the subset of latencies and assigning the rating based on the scores. In some embodiments, computing the rating may involve selectively assigning the latencies in the subset of latencies to groups, calculating group scores based on the latencies assigned to each group, and assigning the rating based on the group scores. In some embodiments, a latency's score may be based on the latency's duration, a portion of the latency's duration in excess of a threshold, and/or a selective weighting process.

In some embodiments, the method may also involve providing a positive recommendation, such as by providing a certification, of the device if its rating is acceptable, and providing a negative recommendation, which may entail not providing a certification of the device, if its rating is not acceptable.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical element that is illustrated in various figures is represented by a like numeral. For purposes of clarity, not every element may be labeled in every drawing. In the drawings.

DETAILED DESCRIPTION

Figure 1:
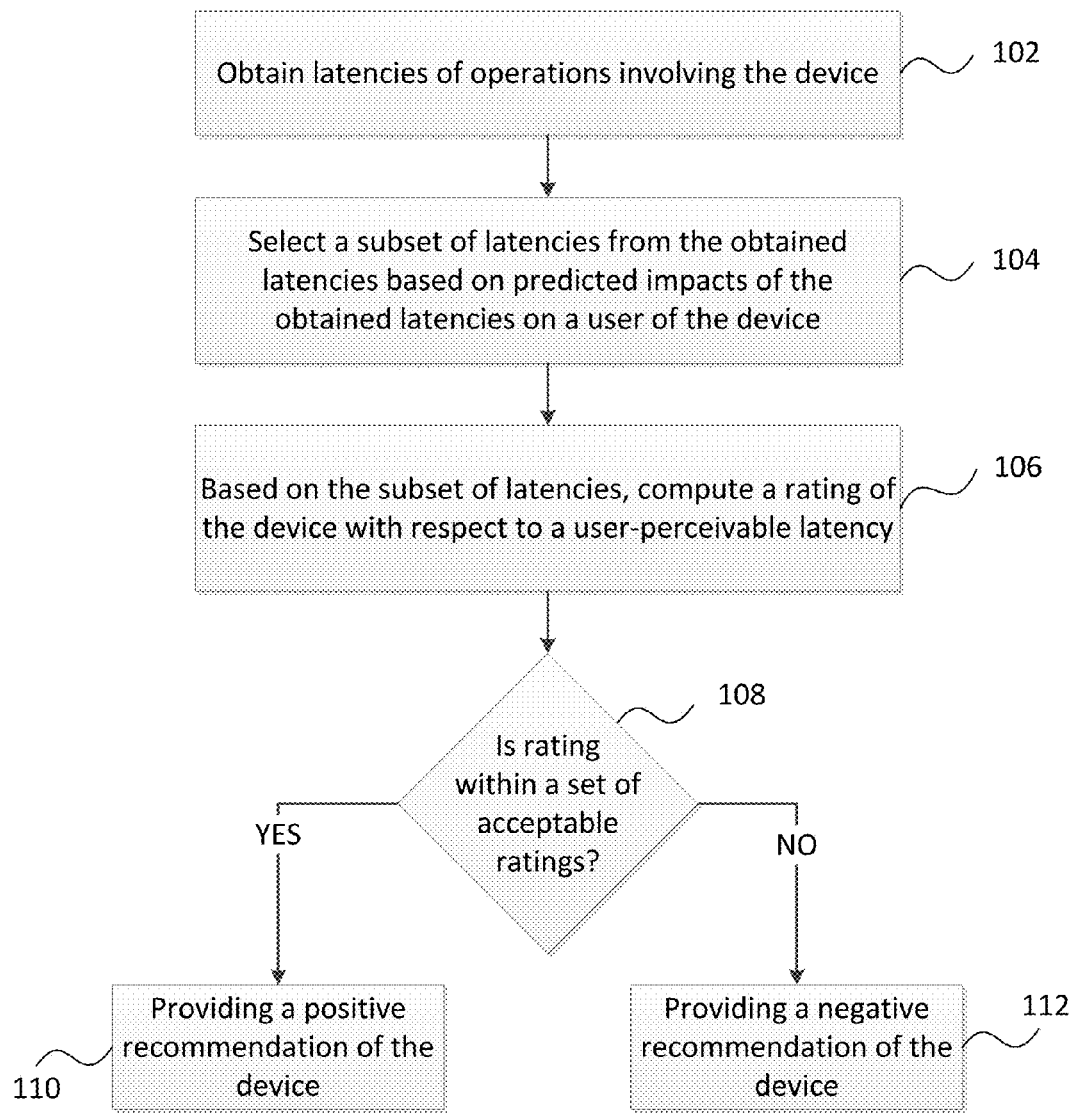
FIG. 1 is a flow chart of an exemplary method of characterizing the performance of a device.

The inventors have recognized and appreciated that the overall experience of a user of a computing device, such as a component, a set of components, or a computer, may be improved by rating devices based on performance metrics that reflect user perception of performance. The inventors have recognized and appreciated, for example, that user perceptions of delay may often diverge from what might be expected from a purely objective measure. Accordingly, a device with a high rating according to a metric based on user perception may be expected to deliver a favorable user experience. In contrast, some devices, which score well based on conventional metrics, may be given a lower rating in accordance with a metric that reflects user perception of performance.

Such ratings may be used as part of a certification program for computers. A computer that achieves a sufficiently high rating to exceed a threshold for certification according to a metric reflecting user perception may be expected to deliver a desirable user experience. Accordingly, a vendor of an operating system or other piece of software who certifies a computing device as a suitable platform for running its software may have greater confidence that customers will recognize value from the total experience offered by the software vendor.

In some specific embodiments, a metric reflecting user perception may be based on a delay, or "latency," in performing an operation. Such a metric may be useful in connection with mobile computers. For example, designers of mobile computers, such as laptops and tablets, may seek to conserve limited battery life by incorporating low-power components into their computers. These designers may rely on performance metrics to select low-power components that provide desired performance levels on workloads of interest to mobile computer users. Though, the performance metrics described herein may be used in any suitable way.

Storage Units

Storage units can be a significant source of both latency and power consumption for mobile computing devices. A wide variety of storage technologies are available. Many storage technologies may be classified as either "rotating drives" or "solid-state drives." Rotating drives may include rotating storage media that are accessed via moving mechanical parts, while solid-state drives may not include rotating media or moving parts. Both rotating drives and solid-state drives may use a variety of interfaces to exchange data with other devices, such as ATA (Advanced Technology Attachment), PATA (Parallel ATA), SATA (Serial ATA), ATAPI (ATA Packet Interface), IDE (Integrated Device Electronics), EIDE (Enhanced IDE), SCSI (Small Computer System Interface), SD (Secure Digital), eMMC (Embedded Multi-Media Card), USB (Universal Serial Bus), Fibre Channel, etc.

A rotating drive may use moving mechanical parts to position a read mechanism or a write mechanism over a portion of a rotating storage medium, and the drive may then use magnetic or optical technology to read data from or write data to that portion of the storage medium. For example, rotating drives may include hard disk drives (HDDs) and optical discs drives (ODDs). A hard disk drive may include a read/write arm that positions read and write heads over various portions of a rotating magnetic disk. As the read or write head passes over a portion of the magnetic disk, the HDD may use magnetics to read data from or write data to that portion of the disk. An optical disc drive may use servos to focus a laser on various portions of a rotating optical disc, such as a compact disc (CD) or a digital video disc (DVD). As the laser focuses on a portion of the optical disc, the optical disc drive may use optics to read data from or write data to that portion of the disc.

Unlike a rotating drive, a solid-state drive (SSD) may store data on a solid-state memory, which has no moving parts. The SSD may read data from or write data to the solid-state memory via an electronic controller. The SSD's solid-state memory may be, for example, non-volatile flash memory.

An embedded multimedia card (eMMC) may be a flash-based solid-state memory that may use relatively little power and therefore may be attractive to designers of laptops and tablets. However, compared to higher-power storage units, an eMMC may require more time to service storage operations, such as read or write operations, at least under some conditions. Thus, some eMMC devices may not provide adequate performance for some workloads, including workloads of interest to users of laptops and tablets.

These various types of storage devices have different latency characteristics that may result in different types of performance when used in different ways in different systems. Though known performance metrics have been applied to such systems, the inventors have recognized and appreciated that existing performance metrics may not reliably predict whether a low-power storage unit such as an eMMC SSD, if integrated into a laptop or tablet, will lead to a computing system that provides a level of performance on a mobile computing device that leads to a satisfying user experience. To accommodate these and other scenarios in which existing metrics do not yield a desirable result, the inventors have conceived of a new metric, referred to as a "user-perceivable latency" metric.

User-Perceivable Latency

The inventors have recognized and appreciated that a computer or other device may be characterized by a user-perceivable latency associated with the device. A latency of a device may be a duration of a time period associated with the device performing a task. This latency may be measured in a context of actual use of the device. For example, latencies of a storage unit for a computer may be tested as part of a computer operating under conditions representing actual use of the computer. Though, any suitable criteria may be used for determining latency.

In some embodiments, the latency of a device may be measured as the time between a request to perform the task and when a response to the request is received. For example, the time period associated with a device's performance of a task may include any time during which the device is actually performing the task. In some embodiments, the time period associated with a device's performance of a task may include queuing time and/or communication time that elapses after instructions have been sent to the device regarding the task and before the device actually begins performing the task. In some embodiments, the time period associated with a device's performance of task may include time that elapses after the device has finished performing the task and before confirmation that the task is complete has been received from the device.

Thus, in some embodiments, a latency of a device may be a duration of a time period that starts when data and/or instructions are sent to the device and ends when a confirmation that the device has completed processing in accordance with the data and/or instructions is received. For example, a read latency of a storage unit may be a duration of a time period that starts when a processor sends signals to the storage unit instructing the storage unit to read data from a specified storage location, and ends when the device's processor receives from the storage unit the data retrieved from the specified location.

Likewise, in some embodiments, a latency of a device may be a duration of a time period that starts when the device receives information and ends when the device completes its processing in accordance with the received information. For example, a write latency of a storage unit may be a duration of a time period that starts when the storage unit receives signals from the processor instructing the storage unit to write specified data to a specified location, and ends when the storage unit writes the specified data to the specified location.

The inventors have recognized and appreciated that a user may perceive different latencies differently, based on the duration or nature of the latency, such that different latencies may be treated differently in arriving at the value of the metric. For example, a user of a device may not perceive all latencies associated with a device. For example, a user may not perceive a brief latency, such as a latency having a duration of 100 milliseconds or less. Accordingly, a latency of this duration or less may either not be included in the computation of a value of a user-perceivable latency metric or may be weighted to have lesser impact than a latency of longer duration.

Also, a user may not perceive a latency associated with an operation if the user can, during that latency, perform other operations. For example, the user may not perceive a latency associated with a storage unit in a computer if, during that latency, the user can continue using the computer in a desired manner without waiting for the storage unit to perform the operation. As a specific example, a user of an application may not perceive a latency of writing data to a storage unit or flushing a cache of the storage unit if the user is able to continue interacting normally with the application before the storage unit finishes performing the data-writing operation or cache-flushing operation. Likewise, a user who is interacting with one application may not perceive a latency associated with a device performing a task initiated by a second application (e.g., if the second application is executing "in the background"). Accordingly, latencies of this nature may be excluded or given a low weighting in the computation of a value of a user-perceivable latency metric.

Any suitable criteria may be used to distinguish between latencies that are likely to have a greater or lesser impact in the computation of a value of a user-perceivable latency metric. As one example, latencies may be distinguished based on attributes of the operations that correspond to the latencies. For example, some computers may assign priority levels to operations. An operation assigned a relatively high priority level may be more relevant to a user's perception of latency than an operation assigned a relatively low priority level. For example, a user may not perceive a latency associated with a device performing a low-priority operation.

As another example, latencies may be distinguished based on locations or addresses associated with the corresponding operations. As a specific example, latencies associated with operations accessing certain locations or addresses may be more likely to be user-perceivable than latencies associated with operations accessing other locations or addresses. As yet another example, latencies may be distinguished based on sizes associated with the corresponding operations. As a specific example, operations accessing a relatively large set of memory locations may be more likely to be user-perceivable than operations accessing a relatively small set of memory locations.

The inventors have recognized and appreciated that performance metrics based on user-perceivable latency (UPL) associated with a device, such as latency attributable to or caused by the device, may provide useful information. Such a metric, for example, may assist computer designers in selecting devices that meet performance targets without exceeding design constraints, such as cost, power, physical size, or thermal constraints. UPL performance metrics may also assist device vendors in producing devices that meet the needs of computer designers.

For example, UPL performance metrics may assist designers of mobile computers in selecting low-power storage units that provide adequate performance on mobile workloads, and may further assist vendors of storage units in designing and manufacturing such storage units. Nevertheless, the utility of UPL performance metrics is not limited to storage units or even to hardware components. Rather, one of skill in the art will understand that UPL performance metrics can be used to characterize the performance of any device or process, including hardware components and software modules.

Many variants of a performance metric based on user-perceivable latency may be useful in characterizing the performance of a device. Variants of a performance metric based on user-perceivable latency may include a cumulative UPL metric, an average UPL metric, and a worst-case UPL metric, among others.

A device's cumulative UPL rating may reflect a user's perception of the total latency associated with the device's handling of a workload. A workload may comprise a plurality of related or unrelated operations. In some embodiments, a device's cumulative UPL rating may be based on a combination of the individual user-perceivable latencies associated with the device's handling of a sequence of one or more operations. In some embodiments, the cumulative UPL rating may have no units (e.g., the UPL rating may be expressed as a numerical score). In some embodiments, the cumulative UPL rating may have units of time (e.g., milliseconds, seconds, etc.) or units of operations (e.g., reads, writes, I/O operations, etc.).

A device's average UPL rating may reflect a user's perception of an average latency or an average user-perceivable latency associated with the device's handling of an operation. In some embodiments, a device's average UPL rating may be based on an average of the individual user-perceivable latencies caused by the device's handling of a sequence of one or more operations.

Alternatively, a device's average UPL rating may reflect a user's perception of the average latency associated with the device during a time period. In some embodiments, a device's average UPL rating may be based on an amount of user-perceivable latency attributable to the device, on average, during a specified time period. In some embodiments, the average UPL rating may have no units. In some embodiments, the average UPL rating may have units such as milliseconds of UPL per second, seconds of UPL per minute, etc. In some embodiments, a device's average UPL rating may be based on a number of operations having user-perceivable latencies during a specified time period, with units of user-perceivable operations per second, user-perceivable operations per minute, etc.

A device's worst-case UPL rating may reflect a user's perception of a worst-case latency associated with the device. In some embodiments, a device's worst-case UPL rating may be the longest user-perceivable latency caused by the device's handling of a sequence of one or more operations. In some embodiments, a device's worst-case UPL rating may be a time period between worst-case user-perceivable latencies. In some embodiments the worst-case UPL rating may have no units. In some embodiments, the worst-case UPL rating may have units of time.

Regardless of the manner in which the UPL rating is expressed, latencies associated with various operations may be collected in any suitable way and used to compute a value of a UPL metric. In some embodiments, latencies may be measured while operations are executed by a device of interest. Though in other embodiments latency information may be collected by running simulations. Whether simulated or measured, the latencies may be collected under conditions that may represent actual use of the device.

As a specific example, a device's user-perceivable latency ratings (e.g., cumulative UPL rating, average UPL rating, and worst-case UPL rating) may be measured while the device is performing operations in accordance with a synthetic benchmark. Alternatively or additionally, latencies may be measured with respect to a real-world workload of interest, which may be determined by capturing a "trace" representing a sequence of operations representative of operation sequences which the device might perform in practice. "Replaying" the captured trace may cause a device being rated to perform the same sequence of operations. Latencies associated with all or a subset of the trace's operations may be measured and used in computing a value of a UPL metric. A value of a UPL metric may be computed for measured latencies for an entire benchmark or trace or for a portion of a benchmark or trace. Alternatively or additionally, latencies may be measured while performing an actual real-world workload of interest.

A First Exemplary Method

Figure 5:
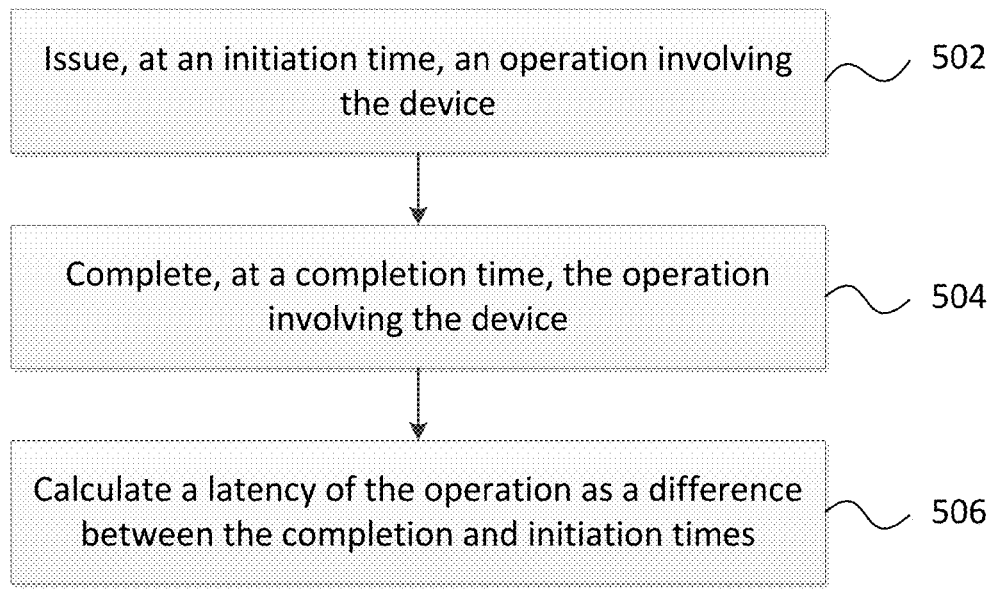
FIG. 5 is a flow chart of an exemplary method of collecting a plurality of latencies corresponding to a plurality of operations involving a device.

FIG. 1. depicts an exemplary method of characterizing the performance of a device with respect to a user-perceivable latency. The latency may be associated with a computer as a whole, with a set of components of the computer, or with an individual component. In this example, the method begins at act 102 with the obtaining of latencies of operations, which may be latencies involving a specific device, such as a storage unit. In that case, the latencies may be only latencies involved with that device performing operations or blocking other operations from being performed. If the device to be rated includes a collection of components, the latencies may be those involved with the devices performing an operation or blocking an operation. Though, the invention is not limited as to the types of devices accessed or types of operations for which latencies are measured, and one or more types of latencies may be measured. The latencies may obtained by any suitable means. For example, the latencies may be collected by performing a test using a computer incorporating a device to be rated or may be received from another source, such as via a computer network. FIG. 5, described below, depicts an exemplary method of obtaining latencies of operations involving a device.

Some of the obtained latencies may then be identified for differentiated treatment in computing values of one or more UPL metrics. In the illustrated example, at act 104 a subset of latencies are selected from the latencies obtained in act 102. The subset of latencies may be selected based on predicted impacts of the obtained latencies on a user of the device. The subset of latencies may be empty, may be a proper subset of the obtained latencies, or may contain all of the obtained latencies. The impact may be predicted by application of one or more criteria.

In some embodiments, the predicted impact of a latency on a device user may depend on whether the latency's duration exceeds a threshold, and/or on an attribute of the operation that corresponds to the latency. As described above, embodiments of the exemplary method are not limited with regards to how the duration of a latency is defined. In some embodiments, a latency of a duration that meets or exceeds a threshold of 100 milliseconds may be predicted to have an impact on a device user.

In some embodiments, the criteria used to predict the impact of a latency on a device user may include a priority of an operation associated with the latency. In some embodiments, a latency associated with a lower-priority operation may be predicted to have less impact on a user than a latency associated with a higher-priority operation. In some embodiments, a latency associated with an operation having a priority below a priority threshold may be predicted to have no impact on a user. In some embodiments, a priority of an operation associated with a storage unit may depend on an amount of data being accessed, a locality of the memory addresses being accessed, a priority of a process issuing the operation, a type of the operation (e.g., read, write, or flush), etc.

In some embodiments, the criteria used to predict the impact of a latency on a device user may include a type of an operation associated with latency. In some embodiments, latencies associated with different types of operations may be predicted to have different impacts on a user. In some embodiments, latencies associated with specified types of operations may be predicted to have no impact on a user. In some embodiments, latencies associated with specified types of operations may be predicted to have an impact on a user. The specified types of operations associated with latencies predicted to have an impact on a device user may vary among embodiments of the exemplary method.

For example, when computing the value of a UPL metric associated with a storage unit, in some embodiments latencies associated with operations that read data from the storage unit may be predicted to have an impact on a user. In some embodiments, latencies associated with operations that write data to a storage unit may be predicted not to have an impact on a user. In some embodiments, latencies associated with operations that flush a cache of storage unit may be predicted to have no impact on a user if the storage unit does not support a cache-flushing operation.

In some embodiments, the criteria used to predict the impact of a latency on a device user may include whether the operation corresponding to the latency is associated with an application executing in a background of a software environment. In some embodiments, a latency associated with an operation issued by a background application may be predicted to have no impact on a user. In some embodiments, a latency associated with an operation issued by a foreground application may be predicted to have an impact on a user.

One of skill in the art will understand that the foregoing examples of factors that may contribute to the predicted impact of a latency on a device user, such as a duration of a latency and various attributes of an operation corresponding to the latency, are non-limiting. In addition, the factors that may contribute to the predicted impact of a latency on a device user may be considered independently or jointly. For example, in some embodiments, all latencies having durations greater than a threshold may be predicted to have an impact on a user. In some embodiments, latencies having durations greater than a threshold may be predicted to have an impact on a user only if the latencies correspond to specified types of operations.

The nature of the predicted impact on a user may vary among embodiments of the exemplary method. In some embodiments, the nature of the predicted impact may be that the latency is predicted to be perceivable to the user. In other words, in some embodiments, a latency may be included in the subset if the latency is predicted to be perceivable by a user of a computing device.

Returning to FIG. 1, at act 106 a rating of the device is computed with respect to a user-perceivable latency of the device. In the exemplary method, the computed rating is based on the subset of latencies selected in act 104. Because the subset includes latencies selected based on predicted user perception, computing a value of a metric based on the subset leads to differentiated processing based on a predicted user perception.

Figure 2:
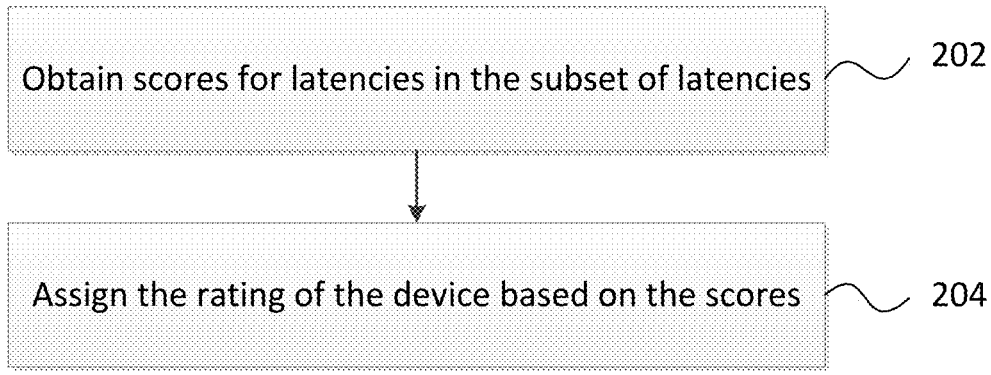
FIG. 2 is a flow chart of an exemplary method of computing a rating of a device.

FIG. 2 depicts an exemplary method of computing a rating of a device with respect to a user-perceivable latency of the device. In this example, the method begins at act 202 by obtaining scores for latencies in a subset of latencies, e.g., the subset of latencies that were selected in act 104 of FIG. 1.

Figure 3:
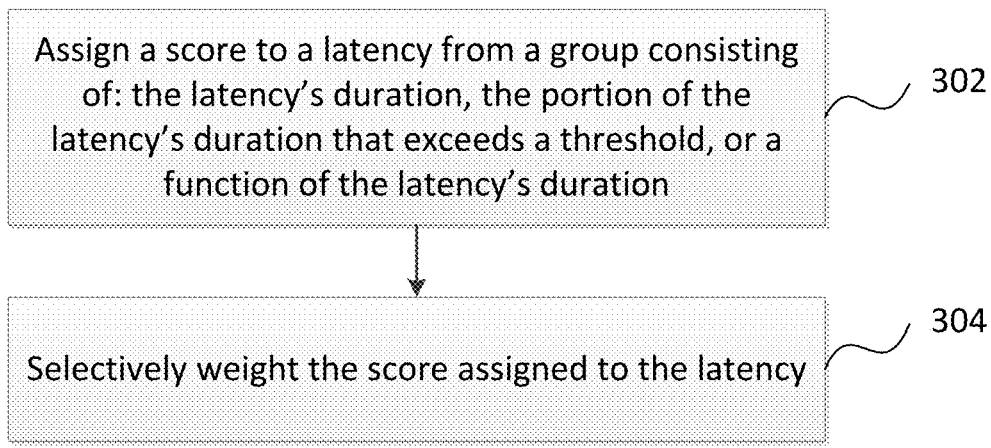
FIG. 3 is a flow chart of an exemplary method of obtaining a score associated with a latency.

FIG. 3 depicts an exemplary method of obtaining scores for latencies in the subset of latencies. In this example, the method begins at act 302 with the assignment of a score to a latency. In some embodiments, the assigned score is the latency's duration. In embodiments where the assigned score is the latency's duration, the exemplary method may omit act 302 by simply treating a latency's duration as the latency's score. In some embodiments, the assigned score is the portion of the latency's duration that exceeds a threshold. In some embodiments, the assigned score is a specified function of the latency's duration.

In some embodiments, the assigned scores are selectively weighted at act 304. In some embodiments, scores corresponding to latencies that are predicted to have a greater impact on a device user may be weighted relatively heavily (in comparison to scores corresponding to latencies that are predicted to have a lesser impact on a device user). In some embodiments, scores corresponding to latencies having durations greater than a threshold may be increased by a specified amount or by a specified factor. This weighting may reflect the observation that a user's frustration with a computing device may increase rapidly as the duration of a user-perceivable latency increases.

In some embodiments, the weight applied to an assigned score may depend on a confidence that the corresponding latency is user-perceivable. For example, during act 104 of FIG. 1, if some factors indicate that a latency is unlikely to be user-perceivable and other factors indicate that a latency is likely to be user-perceivable, a low confidence may be associated with the predicted impact of the latency on a user. By contrast, if all or most factors indicate that a latency is likely to be user-perceivable, a high confidence may be associated with the predicted impact of the latency on a user. Thus, in some embodiments, a confidence associated with the predicted impact of a latency contributes to a weighting of the latency's score.

Though, it should be appreciated that any suitable method may be used to assign a score. As a further example, other operations on-going during the latency may be used to weight the latency. When other operations involving user interaction are performed concurrently with the measured latency, a low weight may be assigned. When all or most other operations are blocked during the latency, a high weight may be assigned.

In other embodiments, act 304 is omitted. In other words, some embodiments do not selectively weight the score assigned to a latency.

Returning to FIG. 2, at act 204 a rating is assigned to the device with respect to a user-perceivable latency, the assigning being based on the scores obtained in act 202. Any suitable computational technique may be used to combine the scores into an overall value of the metric that may be used in rating the device. In some embodiments, the rating may be assigned based on a worst score of the obtained scores. In some embodiments, the rating may be assigned based on a sum of the obtained scores. In some embodiments, the rating may be assigned based on a proportion of the obtained scores that exceed a specified threshold. Embodiments of the exemplary method are not limited in this respect.

In order to calculate a value of a UPL metric for a device, "windowing" techniques may be applied to the latencies in the subset of latencies. In some embodiments, the latencies in the subset of latencies may be selectively assigned to groups. A group score may then be assigned to each group based on the scores associated with the latencies included in the group. The value of the metric may be assigned based on the group scores.

The computed rating may be applied in any suitable way. Returning to FIG. 1, at act 108 a determination is made regarding whether the device rating is within a set of acceptable ratings. In some embodiments, the device rating may be numerical, and the rating may be within a set of acceptable ratings if the rating is greater than (or less than) a specified threshold. In some embodiments, the device rating may be one of an enumerated set of ratings, wherein only a subset of the possible ratings are classified as acceptable.

If the device rating is within the set of acceptable ratings, a positive recommendation of the device may be provided at act 110. In some embodiments, providing a positive recommendation of the device may include certifying that the device satisfies the performance requirements of an application, an operating system, a computer, a class of computers, etc. In some embodiments, providing a positive recommendation of the device may include granting permission for a manufacturer or vendor of a device to display a certification logo on advertisements, packaging, etc. for the device.

If the device rating is not within the set of acceptable ratings, a negative recommendation of the device may be provided at act 112. In some embodiments, providing a negative recommendation of the device may include certifying that the device does not satisfy the performance requirements of an application, an operating system, a computer, a class of computers, etc. In some embodiments, providing a negative recommendation of the device may include denying permission for a manufacturer or vendor of the device to display a certification logo in connection with the device.

Though, it should be appreciated that the specific use of the metric is not a limitation on the invention. In some embodiments, the method illustrated in FIG. 1 may terminate after act 106. That is, in some embodiments, the exemplary method may terminate after computing the device rating with respect to a user-perceivable latency, without determining whether the rating is within a set of acceptable ratings (act 108), and without providing a positive (act 110) or negative (act 112) recommendation of the device.

A Second Exemplary Method

Figure 4:
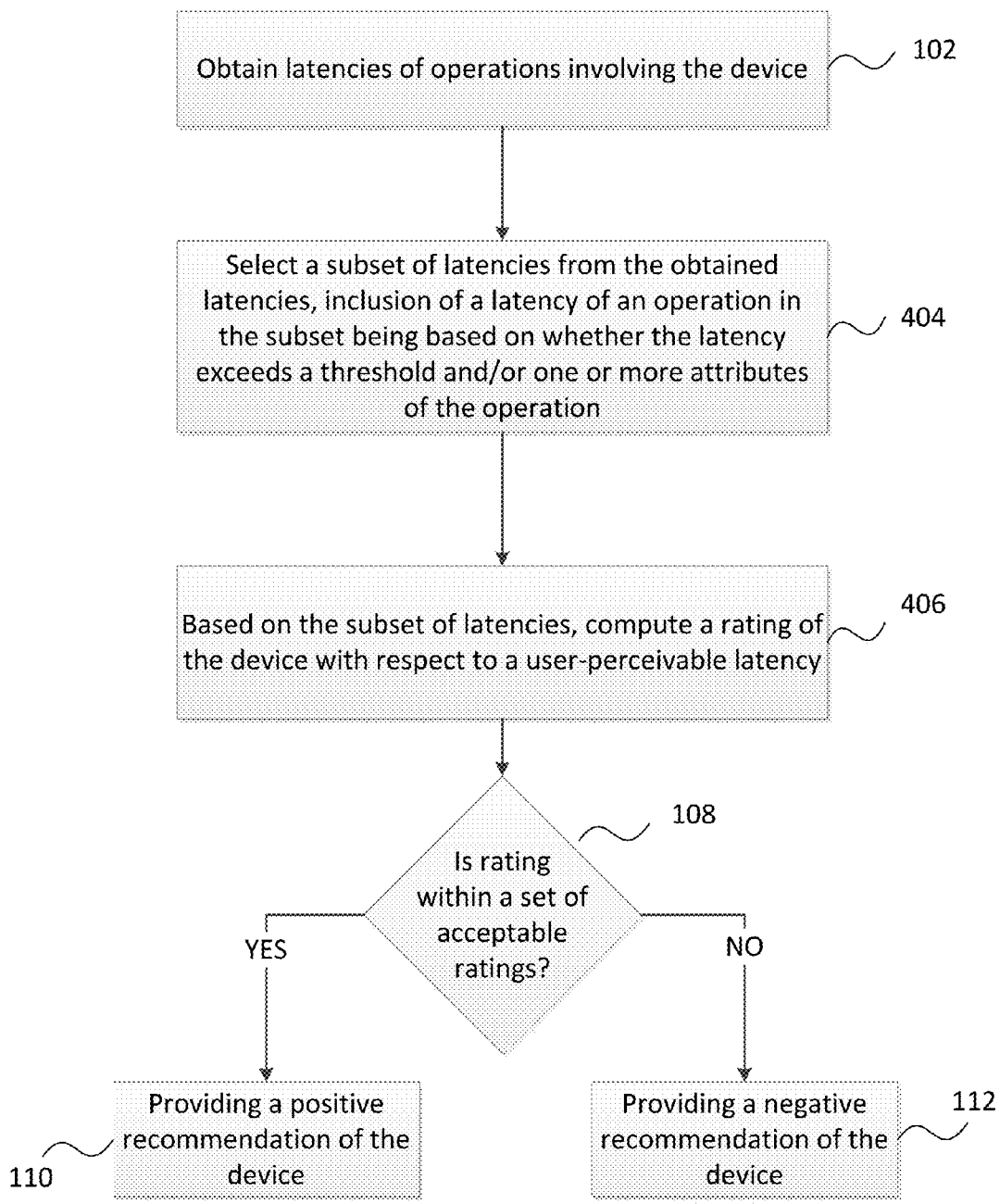
FIG. 4 is a flow chart of another exemplary method of characterizing the performance of a device.

FIG. 4 depicts a second exemplary method of characterizing the performance of a device with respect to a user-perceivable latency associated with the device. Some of the acts in FIGS. 1 and 4 may be similar or identical. Where such acts appear in both FIG. 1 and FIG. 4, the acts are labeled with identical element numbers. Acts of the exemplary method depicted in FIG. 4 that have already been described in connection with the exemplary method of FIG. 1 are not described again in connection with the exemplary method of FIG. 4.

At act 102 of FIG. 4, the latencies of operations involving a device are obtained. At act 404, a subset of the latencies obtained in act 102 are selected.

In some embodiments, inclusion of a latency in the subset of latencies may depend on whether a duration of the latency exceeds a threshold. In some embodiments, a latency having a duration of roughly 100 milliseconds or more may be a candidate for inclusion in the subset, while a latency having a duration of less than roughly 100 milliseconds may be excluded from the subset.

In some embodiments, inclusion of a latency in the subset of latencies may depend on a priority of an operation that corresponds to the latency. In some embodiments, a latency corresponding to a relatively high-priority operation may be a candidate for inclusion in the subset, while a latency corresponding to a relatively low-priority operation may be excluded from the subset.

In some embodiments, inclusion of a latency in the subset of latencies may depend on a type of an operation that corresponds to the latency. In some embodiments, latencies corresponding to operations of a first set of specified types may be candidates for inclusion in the subset, while latencies corresponding to operations of a second set of specified types may be excluded from the subset. The first and second sets of specified operation types may vary among embodiments of the exemplary method. In some embodiments, either the first set of operation types, the second set of operation types, or both sets of operation types may be empty.

In some embodiments, if the device is a storage unit, the first set of operation types may include read operations issued to the storage unit. In some embodiments, if the device is a storage unit, the second set of operation types may include write operations and cache-flushing operations issued to the storage unit.

In some embodiments, inclusion of a latency in the subset of latencies may depend on whether an operation that corresponds to the latency is associated with an application executing in a background of a software environment. In some embodiments, a latency corresponding to an operation associated with a foreground application may be a candidate for inclusion in the subset, while a latency corresponding to an operation associated with a background application may be excluded from the subset.

One of skill in the art will understand that the foregoing examples of factors that may contribute to a latency's inclusion in or exclusion from the subset of latencies are non-limiting. In addition, the factors that may contribute to a latency's inclusion in or exclusion from the subset of latencies may be considered independently or jointly.

Figure 6:
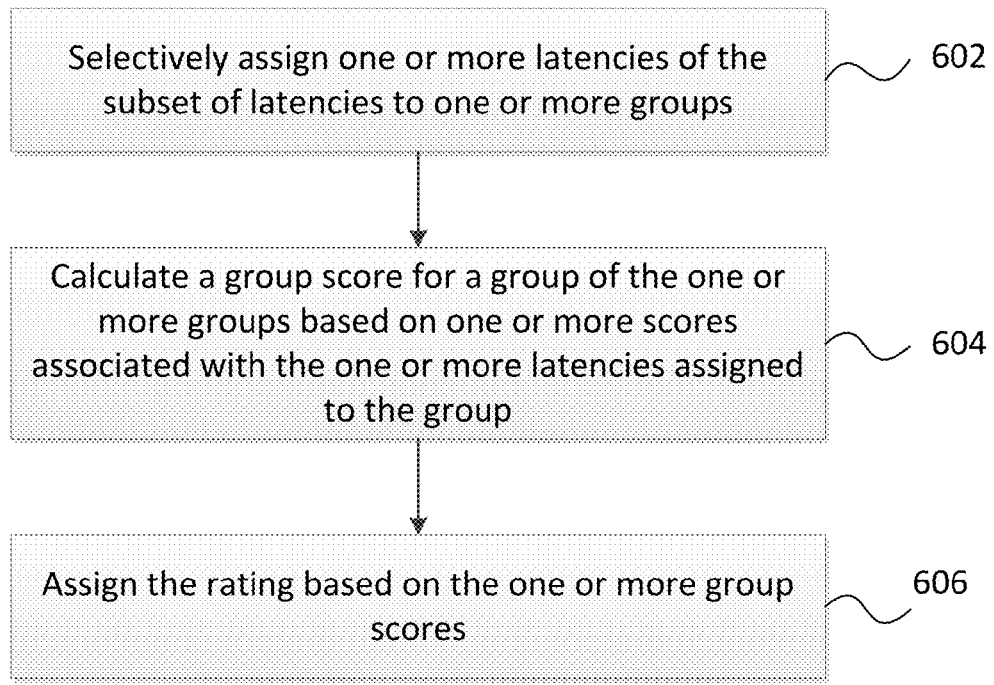
FIG. 6 is a flow chart of another exemplary method of computing a rating of a device.

The exemplary method of FIG. 4 proceeds at act 406 with the computing of a device rating with respect to a user-perceivable latency. FIG. 6 depicts an exemplary method of computing the device rating.

At act 602 of the exemplary method of FIG. 6, latencies are selectively assigned to groups, the assigned latencies being latencies of the subset of latencies selected at act 404 of the exemplary method depicted in FIG. 4. In some embodiments, the selective assignment of latencies to groups may be based on the times at which the operations corresponding to the latencies issue or complete. For example, a first latency and a second latency may be assigned to a same group if the operation corresponding to the second latency issues within a specified window (e.g., a time period or a number of operations) after the operation corresponding to the first latency completes.

The exemplary method of FIG. 6 is not limited with respect to the number of groups. In some embodiments, there may be only one group. In some embodiments, the number of groups may be specified. In some embodiments, the number of groups may depend on the number and/or timing of the latencies.

The exemplary method of FIG. 6 is not limited with respect to whether the groups overlap. In some embodiments, the groups may not overlap (i.e. no latency may be assigned to more than one group). In some embodiments, the groups may overlap (i.e. a latency may be assigned to more than one group).

The exemplary method of FIG. 6 is not limited with respect to the span of a window associated with a group. In some embodiments, the time period associated with a window may be short, or the number of operations associated with a window may be small. In some embodiments, the time period associated with a window may be long, or the number of operations associated with a window may be large. The inventors have recognized and appreciated that small or short windows may be better suited to methods of characterizing user-perceivable latency of a device. In some embodiments, the span of a window may be configured such that latencies assigned to the corresponding group share a locality of time, thereby reducing the likelihood that a large number of user-perceivable latencies (or multiple user-perceivable latencies having very long durations) will be assigned to the same group.

At act 604 of the exemplary method of FIG. 6, group scores of the groups formed in act 602 are calculated based on scores associated with the latencies assigned to the groups. The scores may be associated in any suitable way, including using the technique described above in connection with FIG. 3. In some embodiments, a group's score may be calculated by combining the scores of the group's latencies in some way, e.g., by summing those scores. In some embodiments, a group's score may be calculated by determining a score that is representative of the scores of the group's latencies, such as an average of the latencies' scores, a median of the latencies' scores, or a worst score among the latencies' scores. Embodiments of the exemplary method are not limited in this respect.

At act 606 of the exemplary method of FIG. 6, a rating of a user-perceivable latency of a device is assigned based on the group scores calculated at act 604. In some embodiments, the rating may be assigned based on a combination of the group scores, e.g. a sum of the group scores. In some embodiments, the rating may be assigned based on a score that is representative of the group scores, such as an average of the group scores, a median of the group scores, or a worst score among the group scores. Embodiments of the exemplary method are not limited in this respect.

The remaining acts of the exemplary method of FIG. 4 have been described in connection with the exemplary method of FIG. 1.

A Third Exemplary Method

Figure 7:
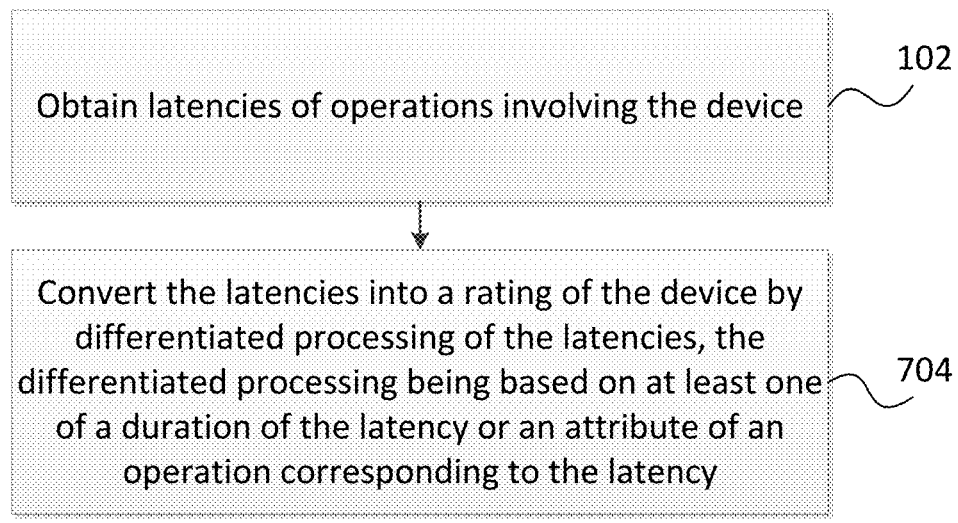
FIG. 7 is a flow chart of another exemplary method of characterizing the performance of a device.

FIG. 7 depicts a third exemplary method of characterizing the performance of a device with respect to a user-perceivable latency associated with the device. Where an act in FIG. 7 may be similar or identical to an act in FIG. 1, the acts are labeled with identical element numbers. Acts of the exemplary method depicted in FIG. 7 that have already been described in connection with the exemplary method of FIG. 1 are not described again in connection with the exemplary method of FIG. 7.

The exemplary method of FIG. 7 begins at act 102 with the obtaining of latencies of operations involving a device. In some embodiments, the latency of an operation may be a duration of a time period associated with the device performing the operation.

The latencies may be obtained in any suitable way. For example, the latencies may be collected from the device using performance-tracking techniques. Techniques of tracking the performance of a device are known to one of skill in the art. Known techniques include creating a "trace log" during execution of software and analyzing the trace log to determine latencies of operations. The trace log may be created by augmenting software with "probes" that write time-stamped entries into the trace log at the beginning and end of an operation.

FIG. 5 depicts an exemplary method of obtaining a latency of an operation involving a device. At act 502 of the exemplary method of FIG. 5, an operation involving the device is issued at an initiation time. In some embodiments, the initiation time may be the time at which the operation issues from an input queue of the device.

In act 504 of the exemplary method of FIG. 5, the operation involving the device completes at a completion time. In some embodiments, the completion time may be the time at which the device sends a signal confirming that the operation is complete. In some embodiments, the completion time may be the time at which a confirmation signal sent by the device is received. In some embodiments, the completion time may be the time at which apparent completion of the operation is perceivable to the user. The time at which apparent completion of the operation is perceivable to the user may precede the time at which the device actually completes the operation.

In act 506 of the exemplary method of FIG. 5, a latency of the operation is calculated as a difference between the completion time and the initiation time.

Returning to FIG. 7, at act 704 of the exemplary method, the latencies obtained at act 102 are converted into a rating of the device with respect to a user-perceivable latency of the device. In the exemplary method of FIG. 7, the conversion comprises differentiated processing of the latencies based on durations of the latencies and/or attributes of the operations corresponding to the latencies. In some embodiments, the act of converting the latencies into a rating of the device further involves selectively providing a recommendation of the device based on the rating.

In some embodiments, the differentiated processing of a latency may include predicting that the latency contributes to a user-perceivable latency if a duration of the latency exceeds a threshold. In some embodiments, the differentiated processing may include predicting that the latency contributes to a user-perceivable latency if an operation corresponding to the latency is associated with a foreground application, has a relatively high priority, or is an operation of a specified type.

Various aspects of the present invention may be used alone, in combination, or in a variety of arrangements not specifically discussed in the embodiments described in the foregoing. Embodiments therefore are not limited to the details and arrangements of features set forth in the foregoing description or illustrated in the drawings. For example, aspects described in one embodiment may be combined in any manner with aspects described in other embodiments.

An Exemplary Apparatus

Figure 8:
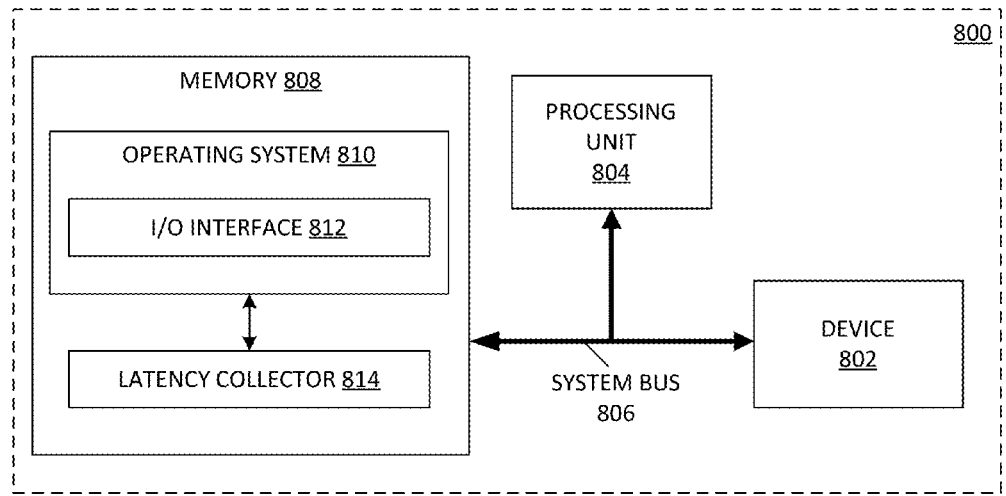
FIG. 8 is a schematic illustration of an exemplary apparatus configured to collect latencies.

FIG. 8 is a block diagram of an exemplary embodiment of an apparatus 800 for collecting latencies associated with a device 802. In the example, the latency-collecting apparatus 800 includes the device 802. Though, in other embodiments (not shown), the device 802 could be connected to the latency-collecting apparatus via an I/O port, a network, etc.

The latency-collecting apparatus also includes a processing unit 804 and a memory unit 808, which are connected by a system bus 806. The memory 808 includes an operating system 810, which includes an input/output interface 812. The memory also includes a latency collector 814.

In this example, the processing unit 804, system bus 806, memory unit 808, operating system 810, and I/O interface 812 may be components as are known in the art or any other suitable components. The processing unit 804 may execute the instructions of software components such as an operating system 810 and a latency collector 814 in order to control the flow of signals on the system bus 806. The I/O interface 812 may send outputs (e.g., commands and data) to devices and receive inputs (e.g., commands and data) from devices, including device 802.

In this example, the device 802 of the exemplary apparatus may be any computing device that may cause a user-perceivable delay. In some embodiments, the device 802 may be a storage unit, a communication unit, a data processing unit, etc. In some embodiments, the device 802 may be an embedded multimedia card (eMMC). In some embodiments, the device 802 may receive signals from the I/O interface via the system bus 806, wherein the signals may contain commands to perform operations and data associated with the operations.

In this example, the latency collector 814 is a software component comprising instructions stored in the memory 808. When the instructions of the latency collector 814 are executed by the processing unit 804, the latency-collecting apparatus 800 may perform a method of collecting latencies of the device 802. Exemplary embodiments of a latency-collecting method are described above.

Figure 9:
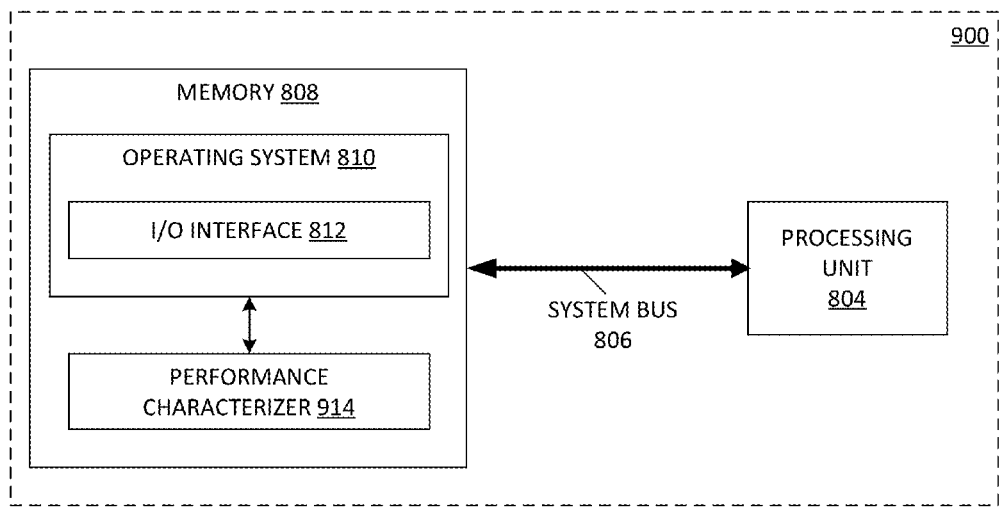
FIG. 9 is a schematic illustration of another exemplary apparatus configured to compute a performance metric.

FIG. 9 is a block diagram of an exemplary embodiment of an apparatus 900 for characterizing the performance of a device with respect to a user-perceivable latency. In the example, the performance-characterizing apparatus 900 does not include the device. Though, in other embodiments (not shown), the device 802 could be connected to the performing-characterizing apparatus via system bus 806, an I/O port, a network, etc.

The performance-characterizing apparatus also includes a processing unit 804 and a memory unit 808, which are connected by a system bus 806. The memory 808 includes an operating system 810, which includes an input/output interface 812. The memory also includes a performance characterizer 914. As discussed above, the processing unit 804, system bus 806, memory unit 808, operating system 810, and I/O interface 812 may be components as are known in the art or any other suitable components.

In this example, the performance characterizer 914 is a software component comprising instructions stored in the memory 808. When the instructions of the performance characterizer 914 are executed by the processing unit 804, the performance-characterizing apparatus 900 may perform a method of characterizing the performance of a device with respect to a user-perceivable latency associated with the device. Exemplary embodiments of the performance-characterizing method are described above.

Though FIGS. 8 and 9 depict the latency collector and the performance characterizer as components of distinct apparatuses, the latency collector and the performance characterizer may be components of a same apparatus. That is, a single apparatus may collect latencies associated with a device and characterize the performance of the device based on the collected latencies.

Additional Teachings

Having thus described several embodiments of this invention, it is to be appreciated that various alterations, modifications, and improvements will readily occur to those skilled in the art.

For example, the foregoing paragraphs describe apparatuses and methods for characterizing the performance of a device. However, embodiments of the inventive methods and apparatuses may characterize the performance of a software component.

Further, the foregoing paragraphs describe embodiments in which a user-perceivable latency is associated with a storage unit of a computer. However, embodiments of the inventive methods and apparatuses may characterize the performance of other components. For example, embodiments may characterize the performance of an encryption accelerator, or the combined performance of an encryption accelerator and a storage unit. An encryption accelerator may encrypt data before the data is sent to a storage unit and/or decrypt data after it is returned from a storage unit.

Further, it is described that embodiments of the latency-collecting apparatus include the device that is the object of the performance-characterization method. However, in some embodiments, the device is not included in the latency-collecting apparatus. In some embodiments, the device may be physically remote from the performance-characterizing apparatus. For example, the device may be a remote satellite.

In addition, it is described that embodiments of the apparatuses include a processing unit and a memory unit. Embodiments of the apparatuses may include one or more processing units and one or more memory units.

Such alterations, modifications, and improvements are intended to be part of this disclosure, and are intended to be within the spirit and scope of the invention. Further, though advantages of the present invention are indicated, it should be appreciated that not every embodiment of the invention includes every described advantage. Some embodiments may not implement any features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology, may operate according to any suitable protocol, and may include wireless networks, wired networks or fiber optic networks.

Also, the various methods or processes outlined herein may be coded as software that is executable on one or more processors of computers that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above.

As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform embodiments of the inventive method need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which three examples have been provided. The acts performed as part of these methods may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of characterizing performance of a device with respect to a user-perceivable latency, the method comprising:
    obtaining a plurality of latencies that each corresponds to a plurality of operations involving the device, where a first group of operations of the plurality of operations correspond to a first application, and where a second group of operations of the plurality of operations correspond to a second application initiated by the first application;
    selecting a subset of latencies from the obtained plurality of latencies, the selecting comprising selection of a latency based on a predicted impact of the latency on a user of the device, where the predicted impact is based on a first weight assigned to each of the plurality of latencies corresponding to the first group of operations and a second weight assigned to each of the plurality of latencies corresponding to the second group of operations; and
    computing, based on the selected subset of latencies, a rating of the device with respect to the user-perceivable latency.

2. The method of claim 1, where the predicted impact is a perceivability of the latency to the user of the device and depends on at least one of: a duration of the latency exceeding a threshold; or an attribute of an operation that corresponds to the latency.

3. The method of claim 2, where the attribute of the corresponding operation is one of: whether the corresponding operation is associated with an application executing in a background, whether the corresponding operation is a read operation, whether the corresponding operation is a flush operation, whether the corresponding operation is a write operation, or a priority of the corresponding operation.

4. The method of claim 1, where computing the rating of the device comprises:
    obtaining scores of respective latencies of the subset of latencies; and assigning the rating based on the obtained scores.

5. The method of claim 4, where obtaining the scores of the respective latencies comprises assigning a score to a first latency from a group consisting of: a duration of the first latency; a portion of the duration of the first latency, the portion of the duration being in excess of a threshold; or a function of the duration of the first latency.

6. The method of claim 4, where assigning the rating based on the obtained scores comprises one of: assigning the rating based on a worst score of the obtained scores; assigning the rating based on a sum of the obtained scores; assigning the rating based on a proportion of the obtained scores that exceed a workload threshold; or assigning the rating based on a function of the obtained scores.

7. The method of claim 4, where assigning the rating based on the obtained scores comprises:
    calculating a group score for the first group of the plurality of operations: and
    assigning, based on the calculated group score, a group rating to the first group of the plurality of operations.

8. The method of claim 1, further comprising:
    providing a positive recommendation of the device if the rating is within a set of acceptable ratings; and
    providing a negative recommendation of the device if the rating is not within the set of acceptable ratings.

9. The method of claim 1, where the user-perceivable latency is attributable to delay associated with the device during execution of a workload on a system comprising the device.

10. A system comprising:
    at least one processor:
    memory; and
    at least one program module, the system configured according to the at least one program module to:
    obtain a plurality of latencies that each corresponds to a plurality of operations involving a device, where a first group of operations of the plurality of operations corresponds to a first application and where a second group of operations of the plurality of operations corresponds to a second application initiated by the first application;
    select a subset of latencies from the obtained plurality of latencies, the selected subset including a latency based on a predicted impact of the latency on a user of the device, where the predicted impact is based on a first weight assigned to each of the plurality of latencies corresponding to the first group of operations and a second weight assigned to each of the plurality of latencies corresponding to the second group of operations; and
    compute, based on the selected subset of latencies, a rating of the device with respect to a user-perceivable latency.

11. The system of claim 10, where the one or more attributes of the operation comprise: an indication of whether the operation is associated with an application executing in a background; a type of the operation; a priority of the operation; a size associated with the operation; and a location associated with the operation.

12. The system of claim 10, in order to obtain the plurality of latencies, further configured according to the at least one program module to:
    issue to the device, at an initiation time, a first operation of the plurality of operations involving the device;

receive a signal that indicates a completion time of the first operation; and calculate a first latency corresponding to the first operation as a difference between the completion time and the initiation time.

13. The system of claim 12, where the initiation time is predetermined based on a trace comprising the first operation.

14. The system of claim 10, in order to compute the rating of the device, further configured according to the at least one program module to:

calculate a group score for the first group of the plurality of operations; and assign, based on the calculated group score, a group rating to the first group of the plurality of operations.

15. The system of claim 14, in order to calculate the group score, further configured according to the at least one program module to:

calculate the rating based on a worst score among the one or more group scores;

calculate the rating based on a sum of the one or more group scores;

calculate the rating based on a proportion of the one or more group scores that exceed a workload threshold; or calculate the rating based on a function of the one or more group scores.

16. At least one computer memory encoded with instructions that cause, based on execution by a computer, the computer to:

obtain a plurality of latencies that each corresponds to a plurality of operations involving the device, where a first group of operations of the plurality of operations correspond to a first application, and where a second group of operations of the plurality of operations correspond to a second application initiated by the first application;

select a subset of latencies from the obtained plurality of latencies, the selected subset including a latency based on a predicted impact of the latency on a user of the device, where the predicted impact is based on a first weight assigned to each of the plurality of latencies corresponding to the first group of operations and a second weight assigned to each of the plurality of latencies corresponding to the second group of operations; and compute, based on the selected subset of latencies, a rating of the device with respect to the user-perceivable latency.

17. The at least one computer memory of claim 16, where the predicted impact is a perceivability of the latency to the user of the device and depends on:

an indication of whether the latency exceeds a threshold, an indication of whether the corresponding operation is associated with an application executing in a background, a type of the corresponding operation, a priority of the corresponding operation, a size associated with the corresponding operation, or a location associated with the corresponding operation.

18. The at least one computer memory of claim 16, where, in order to compute the rating of the device, the instructions further cause the computer to:

map, based on a function, the plurality of latencies to a plurality of respective scores; and assign a rating of the device with respect to the user-perceivable latency based on the plurality of respective scores.

19. The at least one computer memory of claim 16, where the instructions further cause the computer to issue a recommendation based on the rating.

* * * * *